(12) United States Patent
Sato et al.

(10) Patent No.: US 7,854,996 B2
(45) Date of Patent: Dec. 21, 2010

(54) SLIDING MATERIAL AND A METHOD FOR ITS MANUFACTURE

(75) Inventors: Issaku Sato, Tokyo (JP); Sinzo Nakamura, Mooka (JP); Naoki Sato, Tochigi (JP); Toshio Hakuto, Tochigi (JP)

(73) Assignee: Senju Metal Industry Co., Ltd., Tokyo (JP)

( * ) Notice: Subject to any disclaimer, the term of this patent is extended or adjusted under 35 U.S.C. 154(b) by 657 days.

(21) Appl. No.: 11/632,957

(22) PCT Filed: Nov. 12, 2004

(86) PCT No.: PCT/JP2004/016823

§ 371 (c)(1),
(2), (4) Date: Jan. 4, 2008

(87) PCT Pub. No.: WO2006/008842

PCT Pub. Date: Jan. 26, 2006

(65) Prior Publication Data

US 2008/0193324 A1    Aug. 14, 2008

(30) Foreign Application Priority Data

Jul. 20, 2004  (JP) .............................. 2004-211569

(51) Int. Cl.
*B22F 3/26* (2006.01)
*B22F 7/04* (2006.01)

(52) U.S. Cl. .................. 428/548; 428/550; 428/553; 419/2; 419/27

(58) Field of Classification Search .............. 75/247; 419/2, 27; 428/548, 550, 553
See application file for complete search history.

(56) References Cited

U.S. PATENT DOCUMENTS

| 2,379,232 | A | * | 6/1945 | Hensel | 75/228 |
| 3,969,084 | A | * | 7/1976 | Watanabe et al. | 428/567 |
| 4,216,270 | A | | 8/1980 | Lawless et al. | 428/567 |
| 6,746,154 | B2 | * | 6/2004 | Greene et al. | 384/276 |
| 7,128,981 | B2 | * | 10/2006 | Kawachi et al. | 428/642 |
| 2001/0016265 | A1 | * | 8/2001 | Niwa et al. | 428/553 |
| 2002/0037992 | A1 | * | 3/2002 | Niwa et al. | 528/189 |
| 2004/0058828 | A1 | * | 3/2004 | Iwata et al. | 508/104 |

FOREIGN PATENT DOCUMENTS

| DE | 945 970 | 7/1956 |
| DE | 10 2005 023457 | 12/2005 |

(Continued)

*Primary Examiner*—Roy King
*Assistant Examiner*—Ngoclan T Mai
(74) *Attorney, Agent, or Firm*—Michael Tobias

(57) ABSTRACT

A conventional Bi-containing sliding material sometimes underwent seizing in a sliding part operating at a high rotational speed. The present invention provides a sliding material which does not undergo seizing in a sliding part operating at a high rotational speed and a method for its manufacture. A low melting point alloy containing at least 20 mass % of Bi and having a liquidus temperature of at most 200° C. is made to penetrate into a porous portion comprising a Cu—Sn based alloy. A Bi—Sn based alloy or a Bi—In based alloy is suitable as the low melting point alloy. After a low melting point alloy paste is applied to a porous portion, the low melting point alloy is melted and made to penetrate into the porous portion.

10 Claims, 5 Drawing Sheets

FOREIGN PATENT DOCUMENTS

| | | |
|---|---|---|
| JP | 55-054507 | 4/1980 |
| JP | 56016603 | 2/1981 |
| JP | 10330868 | 12/1998 |
| JP | 11050296 | 2/1999 |
| JP | 2001081523 | 3/2001 |
| JP | 2001220630 | 8/2001 |
| JP | 2002285262 | 10/2002 |

* cited by examiner ered or a Cu—Sn based alloy powder mixed with a Bi powder was sintered, since the Bi having excellent sliding properties was enveloped by the porous portion, the amount

SLIDING MATERIAL AND A METHOD FOR ITS MANUFACTURE

TECHNICAL FIELD

This invention relates to a lead-free sliding material and particularly a sliding material suitable for sliding parts of machines operating at high rotational speeds and a method for its manufacture.

BACKGROUND ART

Automobiles, industrial machines, and similar devices contain many rotating portions, which are always equipped with sliding parts. For example, automobiles are equipped with sliding parts such as bearings in portions for receiving a rotating shaft, gear pumps for hydraulic equipment are equipped with sliding parts such as side plates for restraining the side surfaces of gears, and compressors are equipped with sliding parts such as swash plates.

When machines having sliding parts installed therein malfunction and become expensive to repair or become old and no longer function as desired, they are discarded. In order to conserve resources, many of the materials constituting machines are recovered and reused. However, sliding parts installed in machines have been disposed of by burial. This is because in many sliding parts, a steel plate which forms a backing plate and a sliding material cannot be easily separated from each other. In order to increase the mechanical strength of sliding parts, a sliding material and a steel plate are metallically bonded to each other, namely, the metal in the sliding material and the steel plate are metallically bonded to each other with the metal atoms of each one penetrating the other. Therefore, the sliding material and the steel plate cannot be separated from each other and recovered. Accordingly, even if it is attempted to melt sliding parts having a large proportion of iron and recover the iron, a large amount of other components are intermixed with the iron, and it cannot be used as iron resources. Thus, many sliding parts have been disposed of by burial as industrial waste.

Many conventional sliding materials were made of lead bronze (LBC3) in which Pb is added to a Cu alloy. Lead bronze has Pb dispersed in a Cu—Sn alloy matrix. The hard Cu—Sn alloy matrix supports an opposing member without wearing, while the Pb spreads as a thin layer on the surface of the matrix and performs the function of a lubricating oil to provide good sliding properties. Thus, lead bronze is inexpensive and has suitable sliding properties, and it has been used in various types of sliding parts from long in the past.

When Pb is dispersed in a sliding material in this manner, it provides excellent sliding properties. Therefore, it has been conceived of using even more Pb in sliding materials, and the surfaces of such sliding parts have been provided with an overlay in the form of Pb alloy plating. Overlays include Pb alloy plating on the surface of a sliding part, and overlays in which a copper alloy powder is sintered to form a porous portion and a Pb alloy is melted and impregnated into the porous portion. See JP S56-16603A and JP S49-54211A, for example.

However, when sliding parts using lead bronze or sliding parts overlaid with a Pb alloy are disposed of by burial and are contacted by acid rain, Pb in the sliding material is dissolved out and pollutes underground water. If this underground water containing Pb is drunk for long periods of time by humans or livestock, the Pb accumulates in the body, and it is said to eventually cause lead poisoning. Therefore, the use of Pb is now being regulated on a global scale, and there is a strong demand in the industry using sliding parts for a sliding material not containing Pb.

Sliding materials which do not contain Pb have Cu as a main component to which Sn, Ag, Bi, Ni, Fe, Al, Mn, Co, Zn, Si, P, and the like are added. Recently, there have been many proposals of copper based sliding materials which are alloys of Cu, Sn, and Bi. See JP H10-330868A, JP 2001-81523A, JP 2001-220630A, and JP 2002-285262A.

Conventionally, these copper based sliding materials were sintered alloys of a Cu—Sn—Bi alloy powder or sintered alloys of a Cu—Sn based alloy powder mixed with a Bi powder. Bi has the same action as Pb in conventional lead bronze, namely, Bi spreads as a thin layer on the surface of a Cu—Sn alloy matrix acts as a lubricating oil to improve sliding properties.

As shown in FIG. 1, a conventional sliding material of this type (referred to below as a Bi-containing sliding material) comprised a sintered alloy layer 2 of a Cu—Sn—Bi alloy formed on a backing plate 1. The structure of a conventional Bi-containing sliding material is a structure in which a Bi phase 4 is dispersed in a Cu alloy phase 3. The liquidus temperature of the Bi phase is at least 200° C.

A brief explanation will be given of a swash plate for a compressor as an example of a sliding part which uses a sliding material. As shown in FIG. 2, which illustrates a portion of a compressor, a piston 12 is installed inside a cylinder 11 of a compressor 10 so as to reciprocate in the directions shown by arrows A. A pair of shoes 13, 13 is rotatably installed at the center of the piston 12. The pair of shoes 13, 13 sandwiches a swash plate 14 in a sloping state. The swash plate 14 is slopingly mounted on a shaft 15 installed in the vicinity of the cylinder 11.

Sliding materials 16, 16 are bonded to both sides of the swash plate 14. When the shaft 15 rotates, the swash plate 14 rotates while oscillating to the left and right with respect to the piston 12. The sliding materials 16, 16 on both sides of the rotating swash plate 14 slide with respect to the shoes 13, 13 installed in the piston 12, and the piston 12 reciprocates in the direction of arrow A. As a result of the reciprocating movement of the piston 12, a refrigerant gas in piston chambers on its left and right sides is compressed and sent to an unillustrated condenser.

FIG. 3 is a schematic perspective view of the swash plate. As stated above, the swash plate 14 has sliding materials 16, 16 bonded to both sides of a disk-shaped backing plate 17. In order to slopingly mount the swash plate 14 on a shaft, a mounting hole 18 is formed at its center, and a plurality of screw holes 19 is provided in its periphery to secure it to a shaft. If the sliding materials extend up to the location of the screw holes, they will interfere with mounting of the swash plate on a shaft with screws. The sliding materials 16 therefor are provided only on the outer side of the screw holes 19, i.e., in an annular shape excluding the center of the swash plate.

DISCLOSURE OF THE INVENTION

When a conventional Bi-containing sliding material was used in a machine operating at a high rotational speed such as when it was used as a swash plate for the above-described compressor, seizing sometimes took place. In addition, in a conventional Bi-containing sliding material, namely, a sliding material in which a Cu—Sn—Bi alloy powder was sintered or a Cu—Sn based alloy powder mixed with a Bi powder was sintered, since the Bi having excellent sliding properties was enveloped by the porous portion, the amount of Bi exposed to the surface was small, and the sliding properties of Bi could not be adequately exhibited.

The above-mentioned impregnation method is capable of exposing a large amount of a metal having excellent sliding properties to the surface of a sliding material. However, with a conventional impregnation method, when immersing a member having a porous portion formed on a backing plate in molten metal, since the entire backing plate and porous portion are immersed in molten metal, molten metal adheres to unnecessary portions such as the side surfaces or the central portion of a sliding member such as a swash plate and more of the expensive molten metal adheres than is necessary.

During the operation of a machine operating at a high rotational speed, the temperature of sliding parts increases up to about 200° C. due to frictional heat. However, a conventional Bi-containing sliding material could not exhibit sufficient sliding properties at this temperature. Namely, at this operating temperature, the metal solid lubricant in a conventional sliding material was not in a molten state, and sufficient sliding properties could not be exhibited.

If a solid lubricant is in a molten state at the operating temperature of a sliding material, it acts like a lubricating oil and improves sliding properties. However, when the operating temperature of a machine is 200° C., with a conventional Bi-containing sliding material, as stated above, the Bi phase is not yet in a molten state, and the sliding properties are not improved. Therefore, the fact that Bi is not in a molten state at 200° C. in a conventional Bi-containing sliding material was a cause of seizing in a machine operating at a high rotational speed.

The present inventors discovered that if an alloy containing Bi is in a molten state at 200° C. or less, excellent sliding properties can be exhibited, and they completed a sliding material according to the present invention.

In a conventional impregnation method, since flux is applied to a porous portion, and then the porous portion is immersed in a molten metal and impregnated with molten metal, molten metal adheres to unnecessary locations, and an unnecessarily large amount is adhered.

The present inventors focused on soldering using a solder paste, and found that when a solder paste used for soldering of electronic parts comprises solder powder mixed with a flux, soldering of just prescribed locations can be carried out by applying the solder paste to portions to be soldered and then heating. At the time of heating, the flux in the solder paste first flows and then removes oxides on portions to be soldered by reduction and cleans them. Molten solder then wets and spreads on the cleaned portions and soldering takes place. They perceived that if solder paste is applied just to necessary locations, the solder does not adhere to unnecessary locations, and that by just controlling the applied amount of solder paste, a prescribed amount of solder, i.e., of a low melting point metal can be adhered, and they completed a method of manufacturing a sliding material according to the present invention.

Thus, the present invention is a sliding material which can exhibit excellent sliding properties even when installed in a machine operating at a high rotational speed. In addition, the present invention is a method of manufacturing a sliding material which can adhere a metal having excellent sliding properties only in necessary locations and in a suitable amount.

More specifically, the present invention is a sliding material in which a low melting point alloy is made to penetrate into a porous portion comprising a Cu alloy formed on a backing plate, characterized in that the low melting point alloy is a lead-free low melting point alloy containing at least 20 mass % of Bi and having a liquidus temperature of at most 200° C.

From another standpoint, the present invention is a method of manufacturing a sliding material characterized by comprising:

(1) an alloy powder dispersing step comprising dispersing a Cu alloy powder on a backing plate;

(2) a sintering step comprising heating the backing plate on which the Cu alloy powder is dispersed to at most the liquidus temperature of the Cu alloy and forming a porous portion comprising the Cu alloy on the backing plate;

(3) a paste applying step comprising applying a low melting point alloy paste comprising a lead-free low melting point alloy powder containing at least 20 mass % of Bi and having a liquidus temperature of at most 200° C. and a flux to the porous portion;

(4) a penetrating step comprising heating the low melting point alloy paste applied to the porous portion to at least the liquidus temperature of the low melting point alloy to melt it and make the molten low melting point alloy penetrate into the porous portion; and (5) a machining step comprising machining the porous portion into which the low melting point alloy penetrated to a prescribed thickness.

BEST MODE FOR CARRYING OUT THE INVENTION

Figure 1:
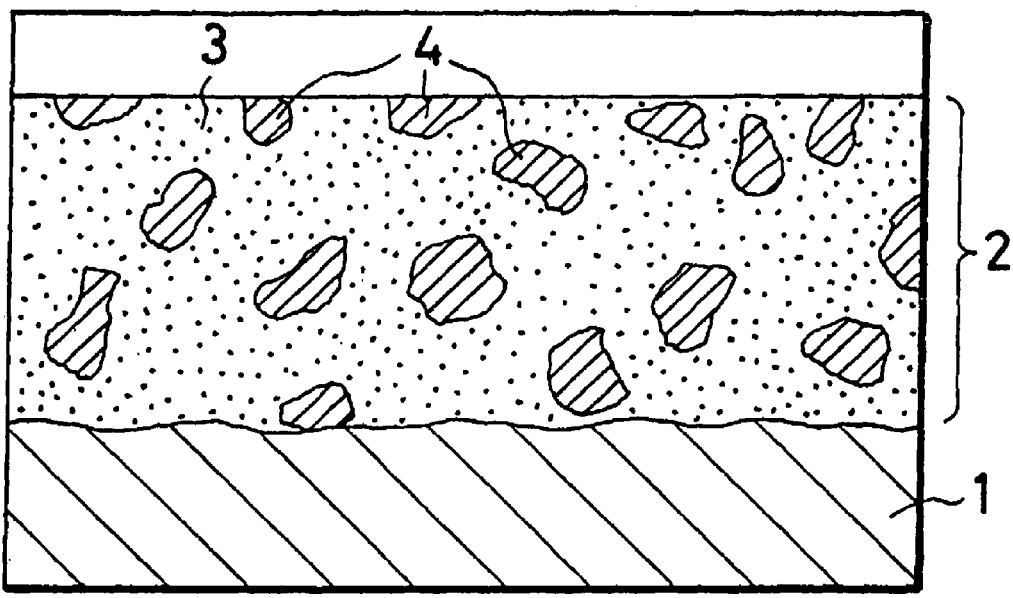
FIG. 1 is a schematic explanatory view of the cross-sectional structure of a conventional sliding material.
Figure 2:
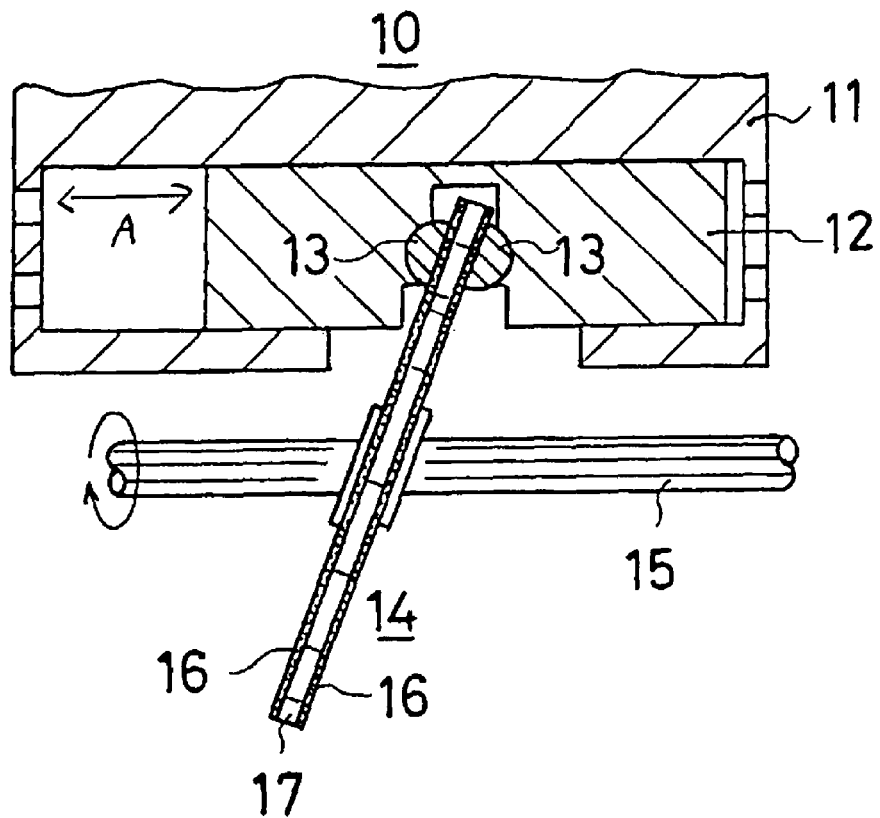
FIG. 2 is a schematic cross-sectional view of a portion of a compressor.
Figure 3:
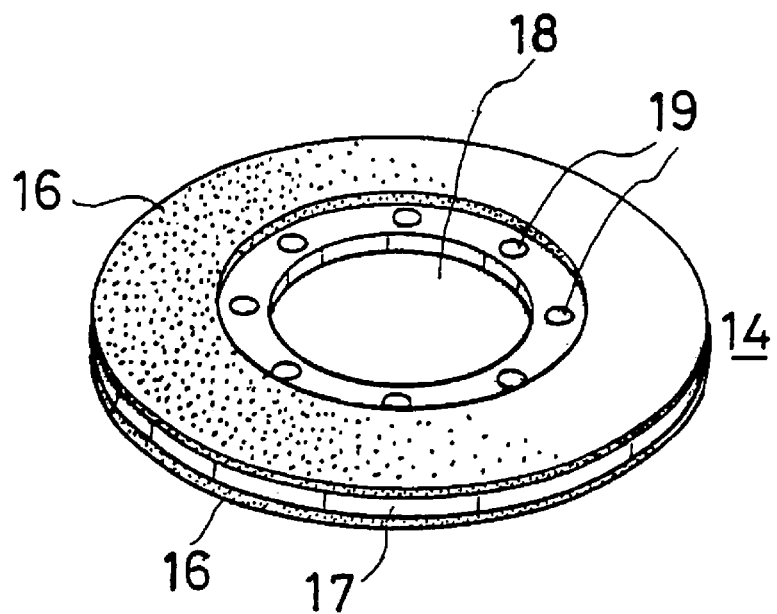
FIG. 3 is a perspective view of the swash plate shown in FIG. 2.
Figure 4:
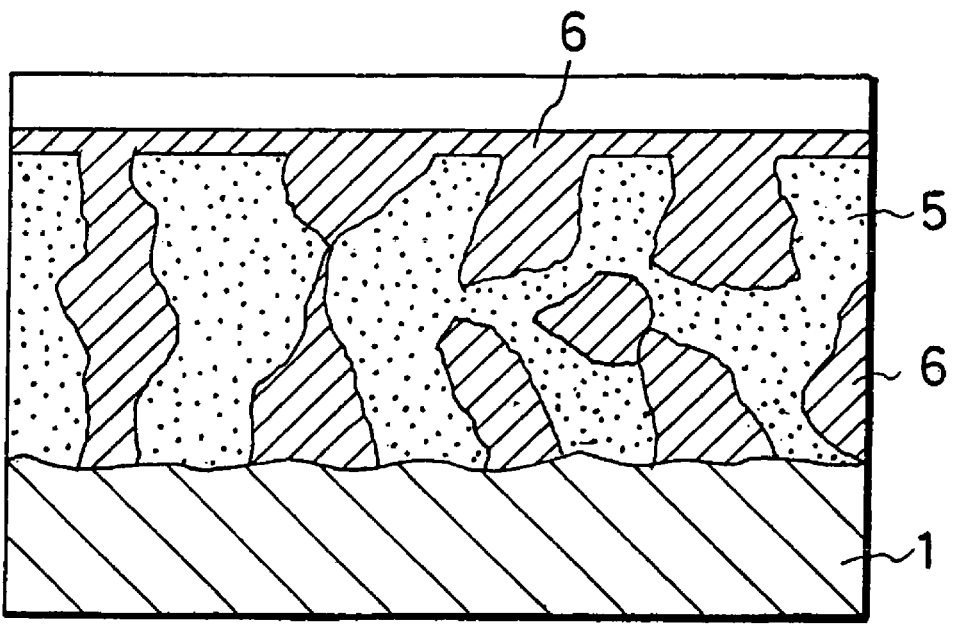
FIG. 4 is a schematic explanatory view of the cross-sectional structure of a sliding material according to the present invention.

As shown in FIG. 4, a sliding material according to the present invention has a porous portion 5 comprising a Cu alloy formed atop a backing plate 1, and a Bi-containing low melting point alloy 6 penetrated into the porous portion 5. Accordingly, in a sliding material according to the present invention, the porous portion 5 comprising a relatively hard Cu alloy supports a sliding body which undergoes sliding, such as a shoe in the case of a compressor. As the sliding body undergoes sliding, the low melting point alloy 6 which penetrated into the porous portion 5 is pulled out, and it covers the surface of the porous portion 5. As the operation of the sliding part continues, the temperature of the sliding material increases due to frictional heat, and the low melting point alloy which covers the surface melts and acts a lubricating oil, whereby good sliding properties are obtained.

The low melting point sliding component used in a sliding material according to the present invention contains at least 20 mass % of Bi. Bi softens as its temperature increases, and Bi is suitable as a solid lubricant for a sliding material. Bi exhibits sufficient sliding properties when it is in a molten state. Accordingly, in situations in which the temperature of the sliding part reaches at least 300° C. at the time of operation, elemental Bi which has a melting temperature of 271° C. can be used. However, in a machine operating at high rotational speeds, the maximum temperature during operation is around 200° C., and elemental Bi cannot be used. If Bi is alloyed with Sn or In, its liquidus temperature can be decreased to 200° C. or less. Therefore, in the present invention, Bi is alloyed with a metal which lowers its liquidus temperature. However, it is not possible to use every Bi-containing low melting point alloy having a liquidus temperature of at most 200° C. Namely, the content of Bi must be at least 20 mass % in order to exhibit the sliding properties of Bi.

In an alloy of Bi and Sn, the liquidus temperature becomes 200° C. or less when the content of Bi is in the range of 20-81 mass percent. In an alloy of Bi and In, the liquidus temperature becomes 200° C. or less when the content of Bi is at most 85 mass %, but as stated above, the content of Bi is made at most 20 mass % even in a Bi—In based alloy. Accordingly, in the present invention, the content of Bi is 20-81 mass percent in the case of a Bi—Sn binary alloy, and the content of Bi is 20-85 mass percent in the case of Bi—In binary alloy.

The most suitable alloy composition of a Bi-containing low melting point alloy for penetrating the porous layer in the present invention is a Bi—Sn or Bi—In eutectic composition. These eutectic compositions have no difference between their solidus and liquidus temperatures, i.e., they melt at the lowest temperature, and they have a marked effect as lubricants. In addition, since Bi and other components are uniformly dispersed in a eutectic composition, constant sliding properties are always obtained in any portion of the Bi alloy.

As long as a low melting point alloy according to the present invention contains at least 20 mass percent of Bi and has a liquidus temperature of at most 200° C., it is possible to add a third element with the object of improving properties of the low melting point alloy such as seizing, bonding to the porous portion, wettability with respect to the porous portion, and decreasing the melting point. Examples of a third element for improving the sliding properties of a low melting point alloy are Ag, Cu, Fe, Mn, Co, Zn, P, Sn, and In. One or more substances selected from this group may be added.

Table 1 shows preferred low melting point alloys for use in the present invention. Each of the examples of the present invention in Table 1 contains at least 20 mass % of Bi has a liquidus temperature of at most 200° C. In contrast, the Comparative Examples in Table 1 have a liquidus temperature of at least 200° C., and they are not suitable for use in the present invention.

TABLE 1

| | | Composition (mass %) | | | | Melting point (° C.) | |
|---|---|---|---|---|---|---|---|
| | No. | Bi | Sn | In | Other | Solidus | Liquidus |
| This Invention | 1 | 57 | rem. | | | 139 | 139 |
| | 2 | 50 | rem. | | | 139 | 155 |
| | 3 | 40 | rem. | | | 139 | 175 |
| | 4 | 30 | rem. | | | 139 | 191 |
| | 5 | 22 | rem. | | | 139 | 200 |
| | 6 | 70 | rem. | | | 139 | 170 |
| | 7 | 80 | rem. | | | 139 | 200 |
| | 8 | 57 | rem. | | Ag 1 | 137 | 137 |
| | 9 | 85 | | rem. | | 110 | 200 |
| | 10 | 70 | | rem. | | 110 | 130 |
| | 11 | 50 | | rem. | | 89 | 96 |
| | 12 | 20 | rem. | | Ag 2 Cu 0.5 | 139 | 200 |
| Comp. Ex. | 1 | 100 | | | | 271 | 271 |
| | 2 | 50 | | | Zn 50 | 416 | 590 |

An alloy having Cu as a primary component is suitable as an alloy for forming a porous member used in the present invention. This is because Cu has a suitable hardness and sliding properties, and it is easily wet by a low melting point alloy in a molten state. A Cu—Sn based alloy is preferred as an alloy having Cu as a primary component for use in the present invention.

There is no particular restriction on the porosity of a sintered Cu alloy according to the present invention, but normally it is preferably 60-80 volume %.

In the present invention, "X based alloy" means an alloy of the indicated elements "X" as well as an alloy containing one or more additional elements. For example, a Bi—Sn based alloy includes an alloy made from Bi and Sn as well as alloys to which at least one other element such as Ag, Cu, Fe, Mn, Co, Zn, P, Sn, or In is added to a Bi—Sn alloy. In the present invention, "penetrate" refers to the state in which a molten alloy penetrates into a porous portion by capillary action and wets the molten portion and is metallically bonded thereto, i.e., in which the low melting point alloy is soldered to the porous portion.

Each of the steps in a manufacturing method for a sliding material according to the present invention will be explained.

(i) Step of Dispersing a Cu Alloy Powder on a Backing Plate:

In the case of a swash plate for a compressor, the backing plate is normally a steel plate, but it is also possible to use a nonferrous metal such as brass. It may be a plate which is cut to prescribed dimensions, or when the sliding material is continuously manufactured, it may be in the form of a strip. Cu alloy powder is dispersed to a prescribed thickness on it to form a powder layer. The Cu alloy powder which is used at this time can be suitably selected based on the type of sliding material which is to be formed. In the case of the present invention, examples are pure Cu, a Cu—Sn alloy (5-20% Sn), and phosphor bronze.

In the present invention, the particle diameter and the like may be the same as when forming a conventional copper based sliding material by sintering, and there are no particular restrictions thereon as long as a prescribed porous sintered layer can be formed.

(ii) Cu Alloy Sintering Step:

This is a step in which a backing plate having a Cu alloy dispersed layer provided thereon is subjected to sintering by heating it to at most the liquidus temperature of the Cu alloy powder. As a result, a porous portion comprising a Cu alloy is formed atop the backing plate. The Cu alloy dispersed layer which is heated to a sintering temperature which is at most the liquidus temperature is sintered in a usual reducing atmosphere to achieve a prescribed porosity. Such a sintering process can be carried out under usual conditions, and there are no particular restrictions thereon in the present invention.

(iii) Step of Applying a Bi-Containing Low Melting Point Alloy Paste:

This is a step in which a low melting point alloy paste is applied to the above-described porous portion. The paste comprises the above-described lead-free low melting point alloy powder for use in the present invention containing at least 20 mass percent of Bi and having a liquidus temperature of at most 200° C. and a flux. Paste itself is already known in the field of soldering technology, and it can be used in the present invention to prepare the above-described low melting point alloy solder paste. As already stated, examples of a preferred alloy for use in the present invention are ones containing 20-81% Bi and a remainder of Sn or 20-85% of Bi and a remainder of In. The paste can be prepared by mixing a resin-based flux with a solder alloy powder having an average particle diameter of less than 150 micrometers.

As described below, examples of methods of applying the paste to a porous portion include the printing method, the dispensing method, and the indirect application method.

According to the present invention, it is possible to easily adjust the amount of a low melting point alloy which penetrates into a porous portion just by adjusting the location where paste is applied and the amount thereof. It is, therefore, also possible to adjust sliding properties. Moreover, in contrast to the impregnation method, it is not necessary to perform melting at a high temperature, and operation can be carried out in air, so it is not necessary to control the atmosphere.

(iv) Penetrating Step:

This is a step in which the low melting point alloy paste which was applied to the porous portion as described above is heated to at least the liquidus temperature of the low melting point alloy and melted, and the molten low melting point alloy is made to penetrate into the porous body.

(v) Machining Step:

This is a step in which the porous portion into which the low melting point alloy penetrated is machined to a prescribed thickness.

Methods of applying the low melting point alloy paste in a manufacturing method according to the present invention include the printing method, the dispensing method, the indirect application method, and the like.

The printing method is a method in which a mesh screen or a metal mask having openings only in portions where the low melting point alloy paste is to be applied is placed atop the porous portion, the low melting point alloy paste is placed atop it, and then the low melting point alloy paste is wiped to a uniform thickness with a squeegee to fill the openings with the solder paste. Thus, the low melting point alloy paste is applied to necessary locations by printing. A mesh screen used in the printing method has a mesh of fine wires molded into the shape of a plate by a resin, and the resin is removed in portions to be printed to form openings.

The dispensing method is a method in which a low melting point alloy paste which fills the inside of a dispenser having the shape of a syringe, for example, is discharged by compressed air and applied just to necessary locations on a porous portion.

The indirect application method is a method in which a low melting point alloy paste is applied to atop a heat resistant plate-shaped member by the printing method or the dispensing method in the same pattern as the necessary locations on the porous portion, and then the member is placed on the porous portion so that the low melting point alloy paste on the plate-shaped member can be transferred to atop the porous portion.

A method of applying a low melting point alloy paste to a porous portion will be briefly explained. FIGS. 5A-5D schematically illustrate the steps in applying a low melting point alloy paste to a swash plate of a compressor by the printing method.

A mesh screen 20 used for manufacturing a sliding material according to the present invention has openings 21 formed therein in the shape of an annulus with approximately the same shape as the porous portions of a swash plate.

Figure 5:
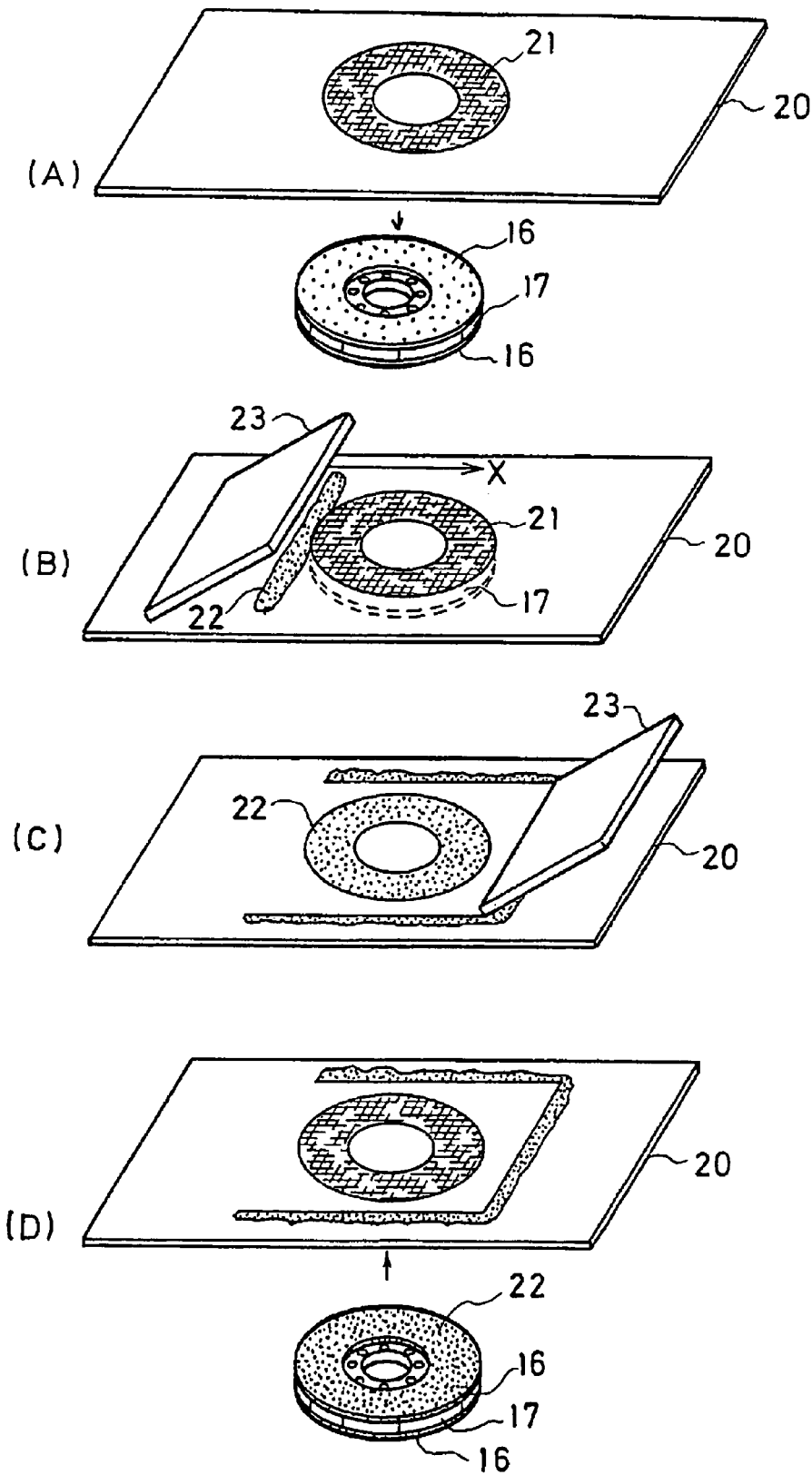
FIGS. 5A-FIG. 5D are schematic explanatory views of each of the steps in a printing method for manufacturing a sliding material according to the present invention.

FIG. 5A: The mesh screen 20 is placed as shown by the arrow atop a backing plate 17 having porous portions 16, 16 formed on both sides thereof so that the openings 21 coincide with one of the porous portions 16.

FIG. 5B: A low melting point alloy paste 22 is placed at one end of the openings 21 in the mesh screen 20, a squeegee 23 is moved in the direction of arrow X, and the low melting point alloy paste 22 is wiped to a uniform thickness.

FIG. 5C: By wiping the low melting point alloy paste to a uniform thickness with the squeegee 23, the low melting point alloy paste 22 is made to fill the interior of the openings 21.

FIG. 5D: When the mesh screen 20 is lifted up, the low melting point alloy paste 22 which filled the openings 21 in the mesh screen is applied by printing to the porous portion 16.

When there are porous portions on both sides as is the case with a swash plate, after the low melting point alloy paste is printed on one side, it can be heated and the low melting point alloy can be made to penetrate into one porous portion, and then in the same manner, the low melting point alloy paste can be applied by printing to the other side and heated, or after applying the low melting point alloy paste to one side, the central portion where the paste is not applied can be supported, and the low melting point alloy paste can be applied by printing to the other side, and both sides can be heated at the same time.

Figure 6:
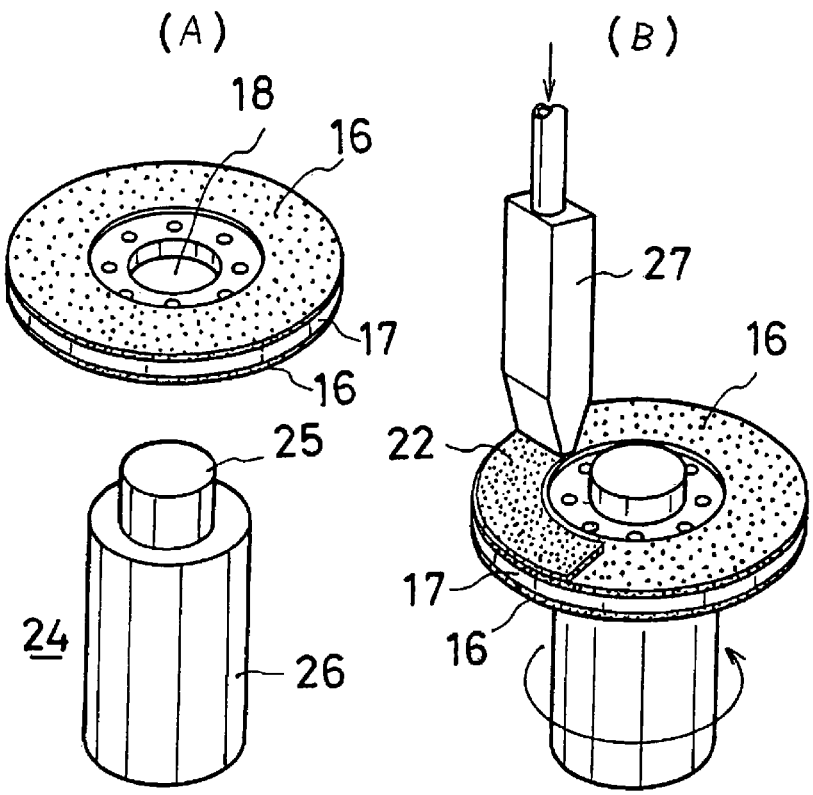
FIGS. 6A and 6B are schematic explanatory views of each of the steps in a dispensing method for manufacturing a sliding material according to the present invention.

A method of applying a low melting point alloy paste to a swash plate by the dispensing method will be explained while referring to FIGS. 6A and 6B.

In the dispensing method, a rotating jig is used. As shown in FIG. 6A, a rotating jig 24 comprises an upper portion having a small-diameter insertion portion 25 and a lower portion having a large-diameter holding portion 26. The insertion portion 25 can easily pass through the hole 18 in the swash plate, and the holding portion 26 has a slightly smaller diameter than the annular porous portions 16. As shown in FIG. 6A, the insertion portion 25 of the rotating jig 24 is inserted into the hole 18 of a backing plate 17 having a porous portion 16, 16 formed on both sides. At this time, the lower side is supported by a step portion of the holding portion 26, but the diameter of the holding portion 26 is slightly smaller than the inner diameter of the porous portion 16, so the holding portion does not contact the porous portion. When the backing plate is held by the rotating jig in this manner, a dispenser 27 having a nozzle width which is roughly the same as the width of the porous portion 16 is disposed so as to be slightly spaced from the porous portion 16. Then, the low melting point alloy paste 22 is discharged from the dispenser 27 while the rotating jig 24 is rotated. As a result, as shown in FIG. 6B, the low melting point alloy paste 22 is applied to the porous portion 16 in an annular shape. After the low melting point alloy paste has been applied to one side in this manner, the low melting point alloy paste may be immediately heated and melted to cause it to penetrate into the porous portion, but it is also possible to turn over the backing plate after applying the low melting point alloy paste to one side and apply the low melting point alloy paste to the other side in the same manner.

Figure 7:
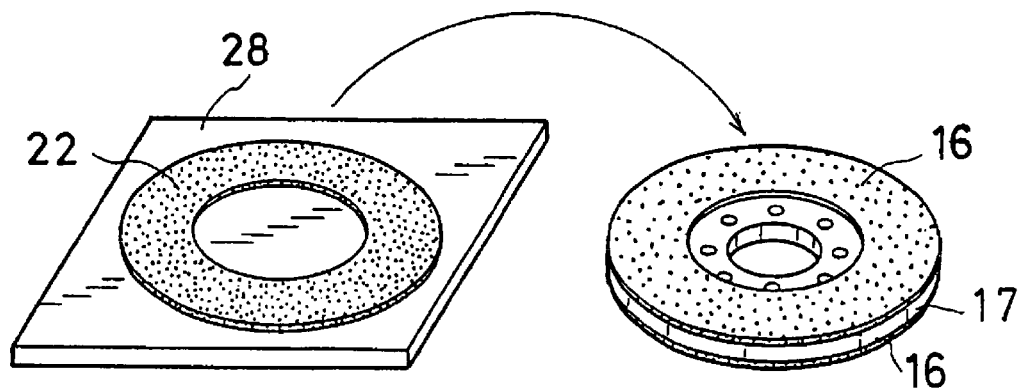
FIG. 7 is a schematic explanatory view of an indirect application method used in the present invention.

A process of applying a low melting point alloy paste to a swash plate by the indirect application method will be explained while referring to FIG. 7. A low melting point alloy paste 22 is applied by the printing method in the same shape as a porous portion to a plate 28 which is heat resistant and to which the molten low melting point alloy does not adhere, such as a ceramic plate, a stainless steel plate, or a heat resistant resin plate. The plate 28 to which the low melting point alloy paste is applied in this manner is inverted and is placed such that the low melting point alloy paste 22 which was applied is disposed atop and in alignment with a porous portion 16. Then, the plate and the low melting point alloy paste are heated to melt the low melting point alloy paste and make it penetrate into the porous portion.

A sliding material according to the present invention has a Bi-containing low melting point alloy having excellent sliding properties penetrated into a porous portion. Thus, the Cu—Sn based alloy of the porous portion can support a high load, while the Bi-containing low melting point alloy which penetrated into the porous portion is melted due to frictional heat while sliding and comes out of the sliding body and covers the surface of the porous portion to prevent seizing from occurring during high speed rotation.

A sliding material according to the present invention contains a Bi-containing low melting point alloy having a liquidus temperature of at most 200° C., and even when the temperature of a sliding part during operation increases to 200° C. as is the case with a compressor having a swash plate rotating at a high speed, the molten Bi-containing low melting point alloy exhibits smooth sliding properties at this temperature, and seizing does not take place.

The sliding material according to the present invention does not contain any Pb at all, and even if a sliding part which can no longer be used is disposed of by burial, it does not cause environmental pollution by polluting underground water.

Since method of manufacturing a sliding material according to the present invention can apply just the necessary amount of a low melting point alloy paste just to necessary locations using a low melting point alloy paste, not only is there no adhesion of a low melting point alloy to unnecessary locations such as occurred in the past when immersing the entirety of a member having a porous portion formed on a backing plate in molten metal, a large amount of an expensive low melting point alloy is not adhered.

The present invention has been explained taking a swash plate for a compressor as an example, but it is apparent to those skilled in the art that the material of the present invention can be utilized in the same manner as a sliding material such as a bearing for a rotating shaft. For example, a porous sintered layer can be continuously formed on a steel strip, a low melting point alloy paste can be applied to one or both sides thereof, and one side at a time or both sides simultaneously can be heated to make a low melting point alloy penetrate into a porous portion.

In this specification, unless otherwise specified, percent with respect to an alloy composition means mass percent.

The effects of a sliding material according to the present invention will be further explained by examples.

Example 1

In this example, a sliding material for a swash plate was manufactured using the following materials.

Cu—Sn based alloy for porous portions: Cu—10% Sn (referred to below as Cu—10Sn) alloy powder (particle diameter: particle size of less than 150 micrometers), Backing plate: diameter of 90 mm, thickness of 6 mm, made of JIS S45C Low melting point alloy paste: a mixture of 58Bi—Sn powder (particle size of less than 60 micrometers) and a pasty flux for soldering having the following composition.

| Polymerized rosin | 50 mass % |
| Diphenylguanidine hydrobromide | 2 mass % |
| Hydrogenated castor oil | 5 mass % |
| Adipic acid | 0.5 mass % |
| Diethylene glycol monohexyl ether | 42.5 mass % |

In this example, a sliding material for a swash plate was manufactured by the following steps.

(1) Alloy powder dispersing step: The backing plate was horizontally disposed, and Cu—10Sn alloy powder was dispersed on the backing plate to form a powder layer having a thickness of approximately 0.5 mm.

(2) Sintering step: The backing plate on which the Cu—Sn alloy powder was dispersed was sintered at 800-850° C. in a sintering furnace containing an ammonia decomposed gas atmosphere to form a porous portion on the backing plate. In the same manner, a porous portion was formed on the other side of the backing plate.

(3) Paste applying step: A mesh screen having openings corresponding to necessary locations of the porous portions was placed on one of the porous portions, a low melting point alloy paste was placed on the openings, the low melting point alloy paste was wiped to a uniform thickness with a squeegee, and the low melting point alloy paste was applied by printing to the porous portion. The low melting point alloy paste was applied by printing to the other side in the same manner.

(4) Penetrating step: The low melting point alloy paste which was applied by printing to the porous portions was heated at 200° C. in a heating furnace to melt the low melting point alloy powder. The low melting point alloy which melted penetrated into the porous portions by capillary action and was metallically adhered thereto.

(5) Machining step: The porous portions on both sides of the backing plate were machined to finish them to a prescribed thickness.

Example 2

In this example, a sliding material for a swash plate was manufactured using the following materials.

Cu—Sn based alloy for the porous portions: Cu—10Sn alloy powder (particle size of less than 150 micrometers)

Backing plate: diameter of 90 mm, thickness of 6 mm, made of JIS S45C

Low melting point alloy paste: a mixture of Sn—2Ag—0.5Cu—20Bi powder (particle size of less than 150 micrometers) and a paste-like flux for soldering (the same as in Example 1)

Manufacture of a sliding material for a swash plate in this example was carried out by the following steps.

(1) Alloy powder dispersing step: Same as in Example 1

(2) Sintering step: Same as in Example 1

(3) Paste applying step: The backing plate was placed on the insertion portion of the rotating jig so that the insertion portion passed through the hole in the backing plate. A dispenser having a nozzle with roughly the same width as the porous portions was slightly spaced from the backing plate, and the low melting point alloy paste was discharged from the dispenser onto the surface of the porous portion while the rotating jig was rotated. The low melting point alloy paste was discharged onto the other side in the same manner.

(4) Impregnation step: The low melting point alloy paste which was applied to the porous portions was heated at 250° C. in a heating furnace to melt the low melting point alloy powder. The molten low melting point alloy penetrated by capillary action into the porous portions which were cleaned by the flux and metallically adhered to the porous portions.

(5) Machining step: Same as in Example 1.

COMPARATIVE EXAMPLE 1

In this example, a sliding material for a swash plate was manufactured using the following materials.

Cu—Sn based alloy for the porous portions: Cu—10Sn—15Bi alloy powder (particle size of less than 150 micrometers)

Backing plate: diameter of 90 mm, thickness of 6 mm, made of JIS S45C

The manufacturing steps for a sliding material for a swash plate in this example were as follows.

(1) Dispersing an alloy powder: Same as in Example 1.

(2) Sintering step: The backing plate on which the Cu—10Sn—15Bi alloy powder was dispersed was sintered at 800-850° C. in a sintering furnace having an ammonia decomposed gas atmosphere, and a sliding portion was formed atop the backing plate. In the same manner, a sliding portion was formed on the other side of the backing plate.

(3) Machining step: Same as in Example 1.

COMPARATIVE EXAMPLE 2

In this example, a sliding material for a swash plate was manufactured using the following materials.

Cu—Sn based alloy for the porous portions: Cu—10Sn alloy powder (particle diameter of less than 150 micrometers)

Backing plate: diameter of 90 mm, thickness of 6 mm, made of JIS S45C

Low melting point alloy: Bi

A sliding material for a swash plate in this example was manufactured by the following steps.

(1) Dispersing step: Same as in Example 1

(2) Sintering step: Same as in Example 1

(3) Impregnation step: A flux for soldering (same as in Example 1) was applied to the porous portions, the porous portions were immersed in a bath containing molten Bi, and the porous portions were impregnated with Bi.

(4) Machining step: Same as in Example 1

COMPARATIVE EXAMPLE 3

In this example, a sliding material for a swash plate was manufactured using the following materials.

LBC3 alloy powder for porous portions: (Cu—10Sn—10Pb) (particle size of less than 180 micrometers)

Backing plate: Diameter of 90 mm, thickness of 6 mm, made of JIS S45C

A sliding material for a swash plate in this example was manufactured by the following steps.

(1) Alloy powder dispersing step: Same as in Example 1

(2) Sintering step: A backing plate on which LBC3 alloy powder was dispersed was sintered at 800-850° C. in a sintering furnace containing an ammonia decomposed gas atmosphere to form a sliding portion on the backing plate. In the same manner, a sliding portion was formed on the other side of the backing plate.

(3) Machining step: Same as in Example 1

Tests for measuring sliding properties were carried out on the above-described examples and comparative examples. The test conditions were as follows.

Figure 8:
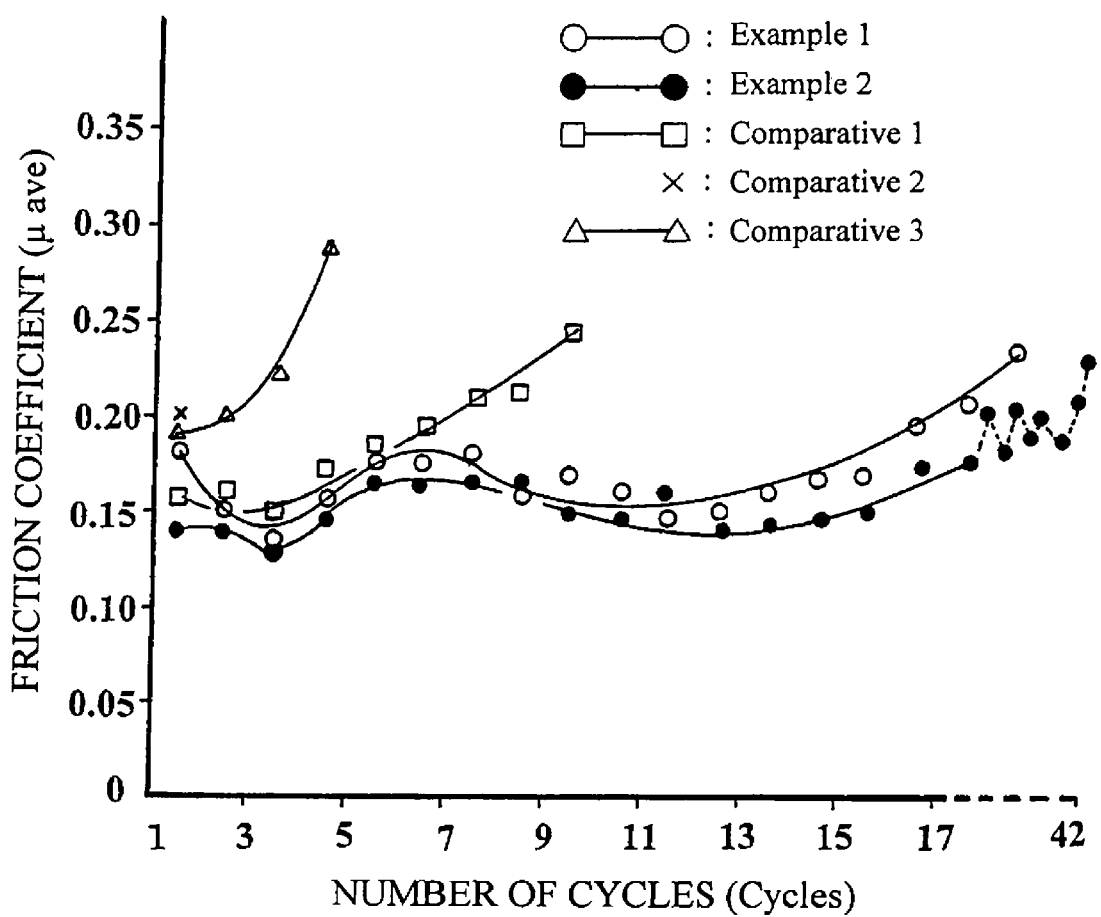
FIG. 8 is a graph showing the results of a test measuring the coefficient of friction.

(I) Test environment: Unlubricated startup (II) Bearing surface pressure: Approximately 2 MPa (III) Peripheral speed: Approximately 15 meters/second (IV) Operating pattern: 90 seconds/cycle The results of a test measuring the coefficient of friction are shown in FIG. 8, and the results of a durability test and a wear rate test are shown in Table 2.

Test measuring the coefficient of friction: Using a thrust friction tester, the coefficient of friction was measured after a peripheral speed of 15 meters/second was reached.

TABLE 2

| | | Tests | |
| --- | --- | --- | --- |
| | | Durability (number of cycles) | Wear rate |
| Example 1 | Penetrate 57Bi—Sn into porous portion made of Cu—10Sn alloy | 17 | 0.78 |
| Example 2 | Penetrate 20Bi—2Ag—0.5Cu—Sn into porous portion made of Cu—10Sn alloy | 41 | 0.7 |
| Comparative Example 1 | Sinter Cu—10Sn—15Bi alloy powder | 8 | 1.27 |
| Comparative Example 2 | Penetrate Bi into porous portion made of Cu—10Sn alloy | 0 | 11.11 |
| Comparative Example 3 | Sinter LBC3 alloy powder | 3 | 2.4 |

In the durability test, a thermocouple was inserted into the backing plate of a test material, and the number of cycles until the temperature of the backing plate reached 200° C. was measured. The rate of wear was the depth of wear (micrometers) divided by the total operating time (the operating time in minutes required for the temperature of the backing plate to reach 200° C. in the above-described cycle test).

As can be seen from the results of the test for measuring the coefficient of friction in FIG. 8, the temperature reached 200° C. in 9 cycles for Comparative Example 1, in 1 cycle for Comparative Example 2, and in 4 cycles for Comparative Example 3, but it took 18 cycles for Example 1 and 42 cycles for Example 2 of the present invention. The difference from the comparative examples is apparent.

In the durability test, the results were 8 cycles for Comparative Example 1, 0 cycles for Comparative Example 2, and 3 cycles for Comparative Example 3, whereas it was 17 cycles for Example 1 and 41 cycles for Example 2. In the rate of wear test, the results were 1.27 micrometers/minute for Comparative Example 1, 11.11 micrometers/minute for Comparative Example 2, and 2.4 micrometers/minute for Comparative Example 3, while it was 0.78 micrometers/minute for Example 1 and 0.70 micrometers/minute for Example 2.

INDUSTRIAL APPLICABILITY

In the examples, a swash plate for a compressor was described, but the present invention is not limited to a swash plate and can be applied to any types of sliding parts such as ordinary bearings and sliding parts of hydraulic machines.

The invention claimed is:

1. A sliding material comprising a backing plate, a porous portion disposed atop the backing plate and comprising a sintered Cu alloy, and a lead-free low melting point alloy penetrated into the porous portion and containing 20-70 mass % of Bi and having a liquidus temperature of at most 200° C.

2. A sliding material as claimed in claim 1 wherein the low melting point alloy includes at least one element selected from the group consisting of Ag, Cu, Fe, Mn, Co, Zn, P, Sn, and Tn.

3. A sliding material as claimed in claim 1 wherein the low melting point alloy consists of Bi and Sn.

4. A sliding material as claimed in claim 1 wherein the low melting point alloy consists of Bi and In.

5. A sliding material as claimed in claim 1 wherein the porous portion comprises a sintered layer formed by sintering a Cu—Sn based alloy powder containing 5-20 mass % of Sn.

6. A method of manufacturing a sliding material comprising:
   dispersing a Cu alloy powder on a backing plate;
   sintering the dispersed Cu alloy powder by heating to at most the liquidus temperature of the Cu alloy powder to form a porous portion comprising the Cu alloy on the backing plate;
   applying a low melting point alloy paste comprising a powder of a lead-free low melting point alloy and a flux to the porous portion, the low melting point alloy containing at least 20 mass % of Bi and having a liquidus temperature of at most 200° C.; and
   heating the low melting point alloy paste applied to the porous portion to at least the liquidus temperature of the low melting point alloy to melt the low melting point alloy and make the molten low melting point alloy penetrate into the porous portion.

7. A method as claimed in claim 6 further including machining the porous portion after penetration of the molten low melting point alloy.

8. A method as claimed in claim 6 including applying the low melting point alloy paste to the porous portion by printing.

9. A method as claimed in claim 6 including applying the low melting point alloy paste to the porous portion by dispensing using a dispenser.

10. A method as claimed in claim 6 including applying the low melting point alloy paste to the porous portion by applying the low melting point alloy paste to a plate, placing the plate atop the porous portion with the paste contacting the porous portion, and then heating the paste to melt it while the plate is disposed atop the porous portion.

* * * * *

UNITED STATES PATENT AND TRADEMARK OFFICE
CERTIFICATE OF CORRECTION

PATENT NO. : 7,854,996 B2  Page 1 of 1
APPLICATION NO. : 11/632957
DATED : December 21, 2010
INVENTOR(S) : Issaku Sato et al.

It is certified that error appears in the above-identified patent and that said Letters Patent is hereby corrected as shown below:

Title page

Item 56 – Foreign Patent Documents

Insert

-- JP    49-054211    5/1974
   JP    52-093610    8/1977 --

Signed and Sealed this
Seventeenth Day of May, 2011

David J. Kappos
*Director of the United States Patent and Trademark Office*